United States Patent
Watanabe et al.

(10) Patent No.: US 10,253,708 B2
(45) Date of Patent: Apr. 9, 2019

(54) SHIFT CONTROL SYSTEM FOR VEHICLE

(71) Applicant: TOYOTA JIDOSHA KABUSHIKI KAISHA, Toyota-shi, Aichi (JP)

(72) Inventors: Hiroshi Watanabe, Sunto-gun (JP); Akira Eiraku, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/814,961

(22) Filed: Nov. 16, 2017

(65) Prior Publication Data
US 2018/0149101 A1   May 31, 2018

(30) Foreign Application Priority Data
Nov. 30, 2016   (JP) ................. 2016-232742

(51) Int. Cl.
| | |
|---|---|
| *B60W 10/06* | (2006.01) |
| *B60W 10/11* | (2012.01) |
| *F02D 41/02* | (2006.01) |
| *B60W 30/19* | (2012.01) |
| *F02D 37/02* | (2006.01) |
| *F16H 63/50* | (2006.01) |
| *F02D 41/12* | (2006.01) |
| *F02D 11/10* | (2006.01) |
| *F16H 59/36* | (2006.01) |
| *F16H 61/02* | (2006.01) |

(52) U.S. Cl.
CPC .......... *F02D 41/023* (2013.01); *B60W 30/19* (2013.01); *F02D 11/105* (2013.01); *F02D 37/02* (2013.01); *F02D 41/123* (2013.01); *F16H 63/502* (2013.01); *F02D 2250/18* (2013.01); *F02D 2400/12* (2013.01); *F16H 2059/363* (2013.01); *F16H 2061/0216* (2013.01)

(58) Field of Classification Search
CPC ...... B60W 10/06; B60W 10/11; B60W 30/19; F02D 41/023; F02D 2250/18; F02D 2400/12; F16H 63/502
See application file for complete search history.

(56) References Cited

U.S. PATENT DOCUMENTS

| | | | |
|---|---|---|---|
| 7,008,344 B2* | 3/2006 | Aikawa ................. | F16H 61/061 192/48.609 |
| 2003/0019313 A1* | 1/2003 | Ibamoto .................. | B60K 6/48 74/339 |
| 2004/0067817 A1* | 4/2004 | Tokura .................. | B60W 10/06 477/107 |
| 2006/0080018 A1 | 4/2006 | Shimada et al. | |

FOREIGN PATENT DOCUMENTS

| | | |
|---|---|---|
| JP | 09-310627 A | 12/1997 |
| JP | 2002-079854 A | 3/2002 |
| JP | 2006-112248 A | 4/2006 |

* cited by examiner

*Primary Examiner* — Edwin A Young
(74) *Attorney, Agent, or Firm* — Sughrue Mion, PLLC

(57) ABSTRACT

A shift control system which can reduce a shift shock is provided. A target torque determiner set a target torque of an engine based on an accelerator position. An actual torque determiner calculates an actual torque of the engine in the inertia phase. A controller calculates an integrated value of a difference between the target torque and the actual torque from a commencement of the inertia phase to a predetermined time point before a termination of the inertia phase, and corrects the target torque in a remaining period between the predetermined time point and the termination of the inertia phase.

7 Claims, 9 Drawing Sheets

|     | C1 | C2 | B1 | B2  | B3 | F1 |
|-----|----|----|----|-----|----|----|
| 1st | ○  |    |    | (○) |    | ○  |
| 2nd | ○  |    | ○  |     |    |    |
| 3rd | ○  | ○  |    |     |    |    |
| 4th |    | ○  | ○  |     |    |    |
| Rev |    |    |    | ○   | ○  |    |

○ : Engagement

SHIFT CONTROL SYSTEM FOR VEHICLE

CROSS REFERENCE TO RELATED APPLICATION

The present invention claims the benefit of Japanese Patent Application No. 2016-232742 filed on Nov. 30, 2016 with the Japanese Patent Office, the disclosures of which are incorporated herein by reference in its entirety.

BACKGROUND

Field of the Invention

Embodiments of the present disclosure relate to a shift control system for vehicle including an automatic transmission in which a gear stage is shifted by manipulating engagement devices such as clutches and brakes.

Discussion of the Related Art

A shift control system for a vehicle executes a shifting operation of a gear stage to adjust an engine speed in accordance with the traveling state of the vehicle when a driver depresses the accelerator pedal or the vehicle speed increases. For example, when the driver depresses the accelerator pedal to execute upshifting to the high speed stage, the shift control system disengages an engagement device in engagement in a low speed stage before shifting, and engages another engagement device for establishing a high speed stage. As a result of shifting of the gear stage, a speed ratio of the transmission is varied so that the engine speed and an input speed to the transmission are varied.

At the time of upshifting to reduce the engine speed by reducing the speed ratio, an engagement device (engaging-side engagement device) for establishing a gear stage of the high speed side engages to reduce the engine speed to a synchronous speed after the upshifting. In this control, for example, the engagement device is gradually engaged while causing a slip to gradually increase a torque transmitting capacity, and consequently the engine speed is reduced while absorbing energy. In this situation, if the engine speed is changed abruptly, a shift shock may be caused. In order to avoid such generation of the shift shock, the engine speed is gradually changed over a predetermined period of time. The amount of energy to be absorbed to reduce an engine speed to a synchronous speed in this manner increases in accordance with the input torque to the automatic transmission or the engine output torque at the time of upshifting. In order to prevent delay in the shifting operation and to limit damage on the engagement device, it is preferable to reduce the input torque to the automatic transmission during execution of the shifting operation.

JP-A-09-310627 describes a torque-down control system for reducing an input torque to an automatic transmission during execution of the shifting operation. The torque-down control system disclosed in JP-A-09-310627 is configured to reduce an engine output torque by reducing air intake to the engine. However, such torque-down control based on the air intake may cause a significant response delay. In order to reduce delay in the engine output torque, the torque-down control system disclosed in JP-A-09-310627 executes at least an ignition timing control or a fuel supply control during a response delay period in the air intake control.

JP-A-2002-079854 describes a reduction control to reduce an engine output torque during downshifting by calculating an engine control amount for controlling the engine output torque. In reduction control, a fuel injection amount is corrected so as to be reduced when an engine speed has reached a reference speed set to be smaller than an expected convergence speed (speed after gear shifting) by a predetermined amount. Specifically, the transmission control system taught by JP-A-2002-079854 is configured to calculate a difference between a target engine speed and an actual engine speed, and calculate a torque amount corresponding to an insufficient or excess energy on the basis of the calculated speed difference. The control system then adds or subtracts the calculated torque amount to or from the torque reduction amount calculated from a predetermined relationship such as a direct proportion function on the basis of the change rate of the engine speed, so as to obtain an engine control amount. The computation of obtaining a control amount is repeated until the engine speed reaches a predetermined speed.

JP-A-2006-112248 describes an engine control system configured to perform a feedback control of an engine output torque so as to adjust an engine speed to a target speed after downshifting. The control system disclosed in JP-A-2006-112248 executes a feedback control based on proportional control until an engine speed becomes a predetermined value, and executes the feedback control based on a proportional control and a differential control upon adding the differential control when the engine speed becomes the predetermined value. Furthermore, when the engine speed exceeds the predetermined value, the system executes feedback control based on a proportional control and an integral control with respect to an engine torque.

As described in JP-A-09-310627, a response delay of the torque-down control resulting from the ignition retard may be reduced to be shorter than a response delay of the torque-down control resulting from a reduction in an air intake. Either control is, however, designed to change an engine output torque indirectly by changing the amount of air/fuel mixture and combustion state, and hence deviation between an actual output torque and a target torque may be caused inevitably. In the torque-down control based on the ignition retard, the reduction width of an engine output torque is small, and hence the engine output torque does not sometimes sufficiently decrease when the engine speed is high. For this reason, owing to control variations, response delays or the like, the deviation between a target torque and an actual torque in torque-down control may also occur at the end of shifting operation. Consequently, the engine speed may be changed significantly to be synchronized at the end of shifting operation to cause a shift shock.

SUMMARY

Aspects of embodiments of the present disclosure have been conceived noting the foregoing technical problems, and it is therefore an object of embodiments of the present disclosure is to provide a shift control system for a vehicle, which can reduce a shift shock by correcting a deviation between a target torque and an actual torque during a torque-down control of a shifting operation, so as to synchronize an engine speed quickly with a target speed at the end of the shifting operation.

In order to achieve the above object, according to the present invention, there is provided a shift control system that is applied to a vehicle including a geared automatic transmission. The transmission is connected to an output side of an engine, and a gear stage of the transmission is shifted among a plurality of stages by manipulating a plurality of engagement devices. In order to achieve the above-explained objective, the control system is provided with a controller for controlling an output torque of the engine during shifting operation of the gear stage of the transmission. Specifically, the controller is configured to: set a target torque of an output torque of the engine in an inertia phase in which an input speed of the transmission is changed by a shifting operation of the gear stage toward a synchronous speed to be achieved in the gear stage to be established after the shifting operation; calculate an actual torque of the engine in the inertia phase; perform a feedback control of the actual torque based on a difference between the target torque and the actual torque; calculates an integrated value of the difference between the target torque and the actual torque from a commencement of the inertia phase to a predetermined time point before a termination of the inertia phase; and correct the target torque in a remaining period between the predetermined time point and the termination of the inertia phase based on the integrated value in such a manner that the input speed is changed toward the synchronous speed.

In a non-limiting embodiment, the controller may be further configured to: divide the remaining period into predetermined units of time; and calculate a correction amount for correcting the target torque of each unit of time by dividing the integrated value by the units of time.

In a non-limiting embodiment, the controller may be further configured to correct the correction amount using a weighting coefficient determined in accordance with a degree of progress of the shifting operation.

In a non-limiting embodiment, the controller may be further configured to correct the correction amount in an initial phase of the inertia phase using the weighting coefficient that is larger than the weighting coefficient used in the later phase of the inertia phase.

In a non-limiting embodiment, the controller may be further configured to calculate the correction amount for each correction period in the inertia phase.

In a non-limiting embodiment, the controller may be further configured to limit the integrated value so as to inhibit the corrected target torque to be reduced lower than a misfire limit torque obtained based on an operating state of the engine.

In a non-limiting embodiment, the controller may be further configured to stop fuel supply to the engine when the target torque corrected by the integrated value falls below a minimum torque of the engine.

Thus, according to the embodiments of the present disclosure, the integrated value for compensating for an insufficiency of the torque resulting from a delay in torque-down control is calculated, and the target torque in the remaining period of the shifting operation is corrected using the calculated integrated value. According to the embodiments of the present disclosure, therefore, the input shaft speed may be adjusted to to the speed of the output shaft at the end of shifting operation. For this reason, a change in the speed at the end of the shifting operation may be reduced thereby reducing a shift shock.

As described, the correction amount for correcting the target torque may be calculated for each unit of time. According to the embodiments of the present disclosure, therefore, fluctuations in the engine speed may be suppressed.

As also described, the correction amount may be corrected using the weighting coefficient. According to the embodiments of the present disclosure, therefore, the target torque may be changed with the progress of the shifting operation.

Specifically, the correction amount may be corrected using the larger weighting coefficient in the initial phase of the inertia phase, and the weighting coefficient is reduced gradually in the later phase of the inertia phase. According to the embodiments of the present disclosure, therefore, the correction amount of the target torque will not be changed significantly in the later phase of the inertia phase.

As also described, the correction amount may be calculated for each correction period in the inertia phase. For this reason, even if the target torque abruptly fluctuates as a result of being corrected by the correction amount, the target torque may be corrected again by the subsequent correction.

In addition, since the integrated value is limited, the corrected target torque will not fall below the misfire limit torque of the engine.

Further, since the fuel supply to the engine is stopped when the target torque corrected by the integrated value falls below the minimum torque of the engine, the fuel will not be wasted.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
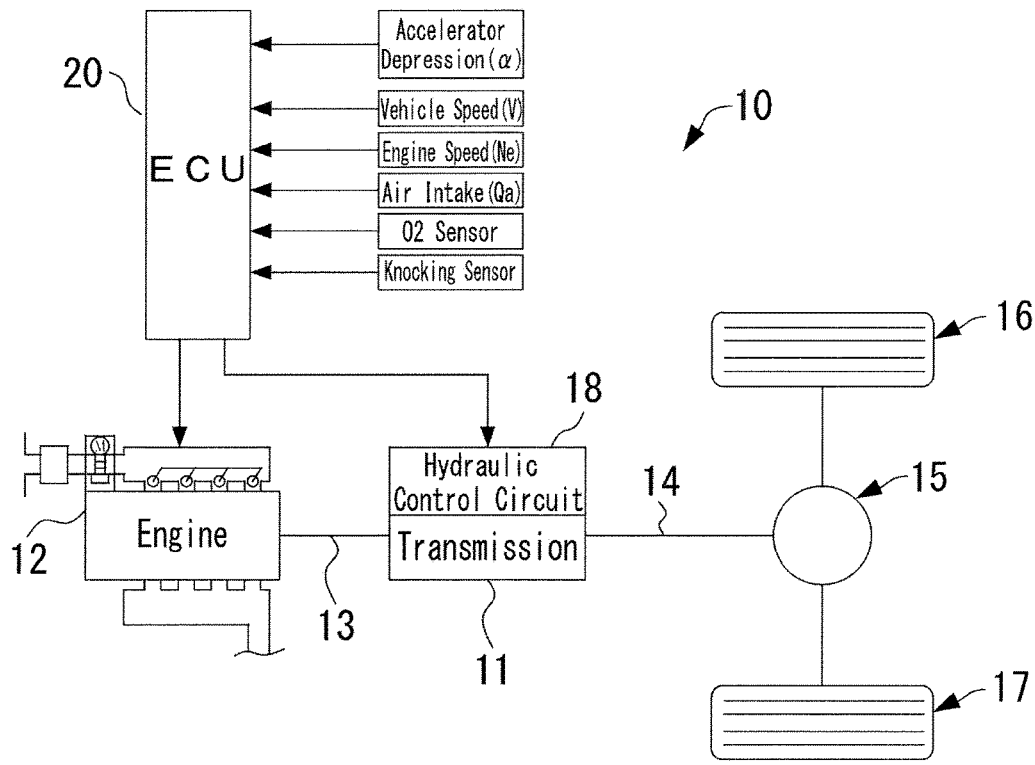
FIG. 1 is a block diagram schematically showing one example of the vehicle to which the control system according to the embodiment of the present disclosure is applied.

FIG. 1 is a block diagram schematically showing an example of a vehicle to which the control system according to at least one embodiment of the present disclosure. As shown in FIG. 1, a vehicle 10 includes an automatic transmission (as will be simply caller the "transmission" hereinafter) 11 that performs a clutch-to-clutch shifting. The transmission 11 is connected to an output side of an engine 12. Driving force generated by the engine 12 is transmitted to an input shaft 13 of the transmission 11. An output shaft 14 of the transmission 11 transmits the driving force to left and right drive wheels 16 and 17 through a differential gear unit 15 as a final reduction gear unit. The engine 12 includes a gasoline engine and a diesel engine. Note that the vehicle according to an embodiment of the present application may include a hybrid vehicle in which a prime mover includes an engine and a motor. Specifically, the control system according to the embodiment may be applied to a vehicle including an engine with a supercharger which may cause a response delay during execution of a torque-down control of shifting operation in a shifting operation of a gear stage of the transmission 11. The prime mover and the transmission 11 may include a torque converter. In addition, not only front wheels but also rear wheels may serve as the drive wheels 16 and 17.

The transmission 11 forms part of a driving power transmission route between the input shaft 13 and the output shaft 14. For example, a speed ratio of the transmission 11 is changed by disengaging an engagement device (disengaging-side engagement device) currently in engagement to establish the current gear stage of low speed side while engaging another engagement device to establish another gear stage, in response to a shifting demand. Each engagement device may be either a clutch device that couples members rotating together or decouples them or a brake device that couples a rotating member to a predetermined fixing portion or decouples them. That is, the transmission 11 is adapted to shift the gear stage by a clutch-to-clutch shifting. Note that it is not necessary to execute the shifting operation of the gear stage of the transmission 11 by the clutch-to-clutch method to all of the available stages.

The engagement devices are hydraulic frictional engagement devices whose torque capacities are controlled by actuators such as a plate clutch and a brake. The actuators may be hydraulic actuators or motor-driven actuators. A hydraulic frictional engagement device is switched between the engaged state and the disengaged state by excitation and non-excitation of a plurality of linear solenoid valves of a hydraulic control circuit 18 or current control. The hydraulic control circuit 18 is manipulated by an electronic control unit (to be abbreviated as the "ECU" hereinafter) 20 as a controller to execute the shifting operation including a timing control and a torque capacity control.

The ECU 20 may be a microcomputer including, for example, a CPU, RAM, ROM, and input/output interface. The CPU performs signal processing in accordance with programs stored in the ROM in advance while using the temporary storage function of the RAM. The ECU 20 receives information such as an accelerator pedal depression (α), a vehicle speed (V), an engine speed (Ne), and an air intake amount (Qa) to the engine 12, and information obtained from an O2 sensor, a knocking sensor, and the like.

An output torque of the engine 12 may also be controlled by the control of the ECU 20. For example, a gasoline engine including a plurality of cylinders in which an air/fuel mixture is burnt may be used as the engine 12. In addition, an air intake amount (Qa) supplied to each cylinder, the throttle opening of each throttle valve, an ignition timing at which ignition is performed by an ignition plug provided for each cylinder, the amount of fuel to be supplied etc. may also be electrically controlled by the ECU 20. In the hybrid vehicle including an engine and a motor (or motor generator), an output torque of the motor as well as a throttle opening, an ignition timing, an amount of fuel to be supplied etc. may also be electrically controlled by the ECU 20.

Although the ECU 20 is illustrated as the single unit in FIG. 1, the ECU 20 may also be formed by combining a plurality of control devices having different functions to execute the after-mentioned controls.

Figure 2:
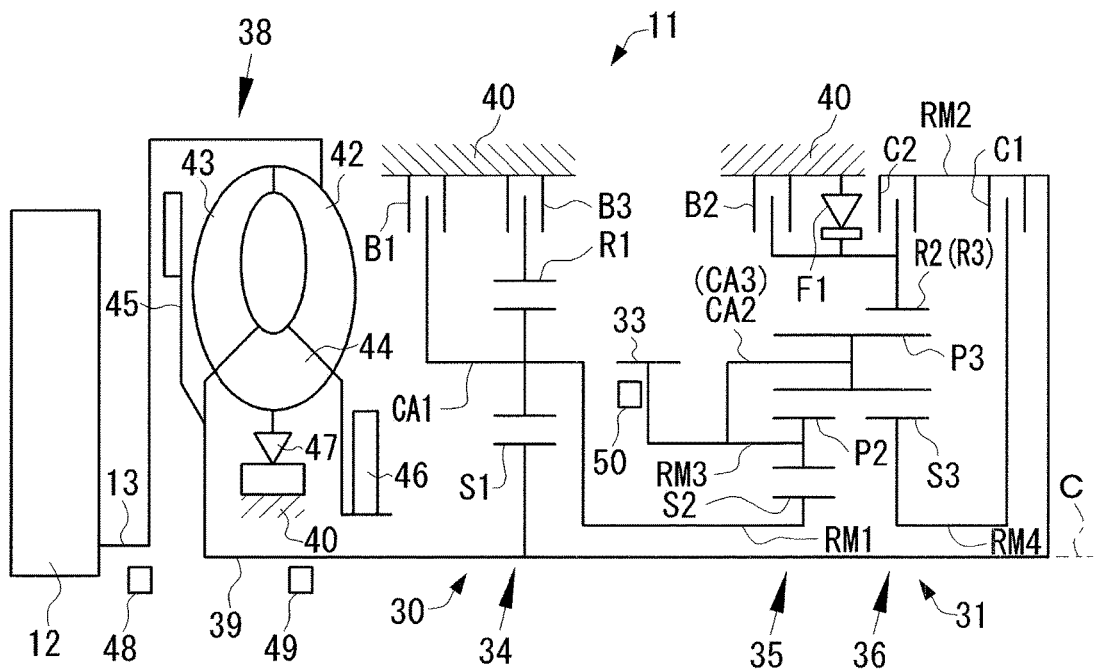
FIG. 2 is a skeleton diagram showing one example of the automatic transmission.

FIG. 2 is a skeleton diagram showing an example of the transmission 11. Note that FIG. 2 shows an example in which the transmission 11 is provided with a torque converter 38. As shown in FIG. 2, the transmission 11 includes a first speed change unit 30 and a second speed change unit 31 on a rotational center axis C so that input torque applied to an input shaft 39 is increased or decreased to be delivered to an output member 33. The first speed change unit 30 is mainly formed of a single-pinion first planetary gear unit 34. The second speed change unit 31 is formed of a Ravigneaux type planetary gear unit formed by combining a double-pinion second planetary gear unit 35 and a single-pinion third planetary gear unit 36.

The input shaft 39 is a turbine shaft of the torque converter 38 as a fluid coupling that is driven by the engine 12 as a power source for traveling. The output member 33 is a counter drive gear for transmitting driving force to the differential gear unit 15 through the output shaft 14. Note that the transmission 11 and the torque converter 38 are substantially symmetrical about the rotational center axis C, and FIG. 2 omits an illustration of the lower half side of the rotational center axis C.

The first planetary gear unit 34 as a component of the first speed change unit 30 includes three rotary elements, namely, a sun gear S1, a carrier CA1, and a ring gear R1. The sun gear S1 is connected to the input shaft 39. The sun gear S1 rotates the carrier CA1 as an intermediate output member when the ring gear R1 is fixed to a housing 40 through a third brake B3.

As described, the second speed change unit 31 includes a Ravigneaux type planetary gear unit, and hence includes four rotary elements, namely, a first rotary element RM1, a second rotary element RM2, a third rotary element RM3, and a fourth rotary element RM4. The first rotary element RM1 is integrated with a sun gear S2 of the second planetary gear unit 35. The second rotary element RM2 is formed by connecting a ring gear R2 of the second planetary gear unit 35 to a ring gear R3 of the third planetary gear unit 36. The third rotary element RM3 is formed by connecting a carrier CA2 of the second planetary gear unit 35 to a carrier CA3 of the third planetary gear unit 36. The fourth rotary element RM4 is integrated with a sun gear S3 of the third planetary gear unit 36. A one-way clutch F1 that permits the forward rotation (i.e., in a rotational direction of the input shaft 39) of the second rotary element RM2 and inhibits the reverse rotation of the second rotary element RM2 is disposed between the second rotary element RM2 and a case 26 in parallel with a second brake B2.

The second planetary gear unit 35 and the third planetary gear unit 36 share a common member such as the carrier CA2 and the carrier CA3, and also share a common member such as the ring gear R2 and the ring gear R3. Pinion gears P3 of the third planetary gear unit 36 are individually meshed with second pinion gears P2 of the second planetary gear unit 35.

The sun gear S2 is connected to the carrier CA1 of the first planetary gear unit 34, and is selectively connected to the housing 40 through a first brake B1 to be halted. The ring gear R2 and the ring gear R3 are selectively connected to the input shaft 39 through a second clutch C2, and are selectively connected to the housing 40 through the one-way clutch F1 and the second brake B2 to be halted. The carrier CA2 and the carrier CA3 are connected to the output member 33. The sun gear S3 is selectively connected to the input shaft 39 through a first clutch C1.

The gear stage of the transmission 11 is shifted by manipulating the first clutch C1, the second clutch C2, the first brake B1, the second brake B2, and the third brake B3 individually as the frictional engagement device.

The torque converter 38 hydraulically transmits power of the engine 12 to the transmission 11. The torque converter 38 includes a pump impeller 42, a turbine runner 43, and a stator 44. The pump impeller 42 is connected to the output shaft (i.e., the input shaft 13) of the engine 12, and the turbine runner 43 is connected to the input shaft 39. The stator 44 is connected to the housing 40 of the transmission 11 through a one-way clutch 47. A lockup clutch 45 is disposed between the pump impeller 42 and the turbine runner 43. An operating mode of the lockup clutch 45 is hydraulically shifted among an engagement mode, a slip mode, and a disengaged mode by the hydraulic control circuit 18, and causes the pump impeller 42 and the turbine runner 43 to integrally rotate when brought into the engagement mode.

A mechanical oil pump 46 is driven by the engine 12 to deliver initial pressure to the hydraulic control circuit 18. The transmission 11 is provided with an engine speed sensor 48 that detects the engine speed (Ne) and a turbine speed sensor 49 that detects an output shaft speed (NT) of the torque converter 38 (a speed (NIN) of the input shaft 39). The transmission 11 is further provided with an output shaft speed sensor 50 that detects a speed (NOUT) of the output member 33 of the transmission 11. The engine speed sensor 48, the turbine speed sensor 49, and the output shaft speed sensor 50 transmits signals to the ECU 20. The vehicle speed (V) corresponds to the speed (NOUT) of the output member 33.

Figures 3, 4:
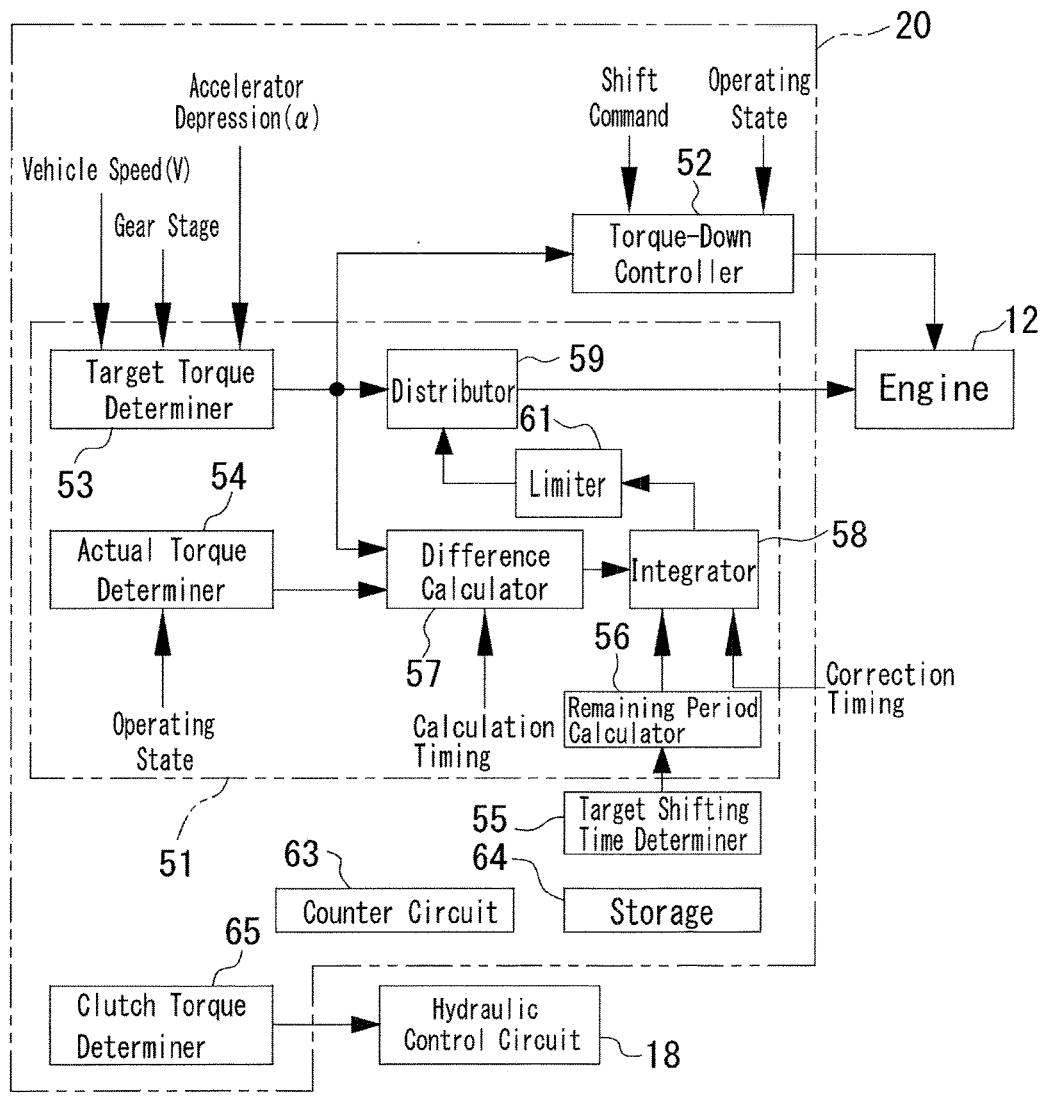
FIG. 3 is a table showing engagement states of the engagement devices of the transmission shown in FIG. 2.
FIG. 4 is a block diagram showing functions of an electronic control unit.

FIG. 3 is a table indicating engagement states of the engagement devices of the transmission 11. Referring to FIG. 3, "∘" represents engagement of the engagement device, "(∘)" represents engagement of the engagement device to establish an engine braking force, and a blank represents disengagement of the engagement device. As can be seen from FIG. 3, the transmission 11 is adapted to shift a gear stage by a clutch-to-clutch shifting by manipulating the clutch C1, the clutch C2, and the brakes B1 to B3.

FIG. 4 is a block diagram showing functions of the ECU 20. As shown FIG. 4, the ECU 20 is configured to perform at least engine torque control in connection with the shifting operation to reduce a stepwise torque change and improve shifting performance. Specifically, the ECU 20 controls an engine torque in such a manner as to operate the engine 12 at an optimally fuel efficient point based on the accelerator pedal depression (α), a gear stage, and the vehicle speed (V) by cooperatively controlling the throttle valve and the shifting operation of the gear stage. Throttle valve is controlled to change the intake air amount (Qa) by opening/closing the throttle valve using an actuator such as a motor on the basis of the accelerator pedal depression (α). Gear stage of the transmission 11 is shifted to change the engine speed (Ne) by changing a clutch torque in accordance with the gear stage and the vehicle speed (V). The engine torque may be controlled by a fuel cut-off control in which only ignition is executed while inhibiting fuel supply, and ignition cut-off control in which only fuel supply is executed while inhibiting ignition. A clutch torque corresponds to a torque capacity of the engagement device of the transmission 11.

The ECU 20 includes a target torque corrector 51, a torque-down controller 52, a target shifting time determiner 55, a counter circuit 63, a storage 64, and a clutch torque determiner 65. The target torque corrector 51 includes a target torque determiner 53, an actual torque determiner 54, a remaining period calculator 56, a difference calculator 57, an integrator 58, a distributor 59, and a limiter 61.

The target torque determiner 53 is configured to obtain a target torque (Td) of the output torque of the engine 12 in an inertia phase. Specifically, the target torque (Td) may be determined with reference to a map or using a formula installed in the storage 64 for determining the target torque (Td) based on a first parameter representing the current traveling state of the vehicle such as a gear stage (i.e., a speed ratio), the accelerator pedal depression (α), and the vehicle speed (V). Instead, given that gasoline engine is used as the engine 12, the target torque (Td) may also be determined with reference to a map for determining the target torque (Td) based on a second parameter such as an ignition timing, a fuel supply amount, a throttle opening corresponding to an accelerator depression, and the air intake amount (Qa).

The actual torque determiner 54 is configured to calculate an actual torque (Tc) of the engine 12 in the inertia phase. For example, the actual torque (Tc) may be determined with reference to a map for determining the actual torque (Tc) based on a third parameter representing the current operating state of the engine 12 such as the engine speed (Ne), a filling efficiency, a target ignition timing, an air/fuel ratio, and a total fuel calorific value. The target ignition timing may be obtained with reference to a map for determining the target ignition timing based on a fourth parameter representing the operating state of the engine 12 such as the engine speed (Ne) and the air intake amount (Qa). An air/fuel ratio may be detected by the O2 sensor attached to the exhaust manifold of the engine 12. The filling efficiency may be obtained may be determined with reference to a map or using a formula for determining the filling efficiency based on a throttle depression and the intake air amount (Qa). The total fuel calorific value is estimated on the basis of the properties of a fuel obtained by a fuel property sensor. The actual torque (Tc) may also be obtained using a formula determined on the basis of the third parameters, and a target shifting time (Ttgt) may be obtained using a formula determined on the basis of the fourth parameters. The ECU 20 performs the feedback control of the actual torque (Tc) on the basis of the difference between the target torque (Td) and the actual torque (Tc) in the inertia phase.

The clutch torque determiner 65 determines the target shifting time (Ttgt) with reference to a map for determining the target gear shifting time (Ttgt) based on a fifth parameter such as a selected gear stage, the target torque (Td), and the vehicle speed (V). The target shifting time (Ttgt) may also be obtained using a formula determined based on the fifth parameters. The target shifting time (Ttgt) corresponds to a period from a commencement of the inertia phase to a termination of the inertia phase.

The clutch torque determiner 65 determines a required clutch torque of each engagement device with reference to a map for determining the required clutch torque based on a sixth parameter such as a shifting pattern governed by gear stages before and after shifting, the target torque (Td), and the vehicle speed (V).

Note that clutch torque may be obtained by various kinds of conventionally known methods. For example, a clutch torque of the engagement device to be engaged after the shifting operation may be calculated based on a target shifting time (Ttgt) and a torque applied to the engagement device after shifting operation, taking account of a shifting pattern and an accelerator position. A clutch torque of the engagement device to be disengaged after the shifting operation may be calculated based on a ratio of the calculated clutch torque of the engagement device to be engaged after the shifting operation to clutch torque of the engagement device to be disengaged after the shifting operation.

The shifting operation of the transmission 11 is completed when the engine speed (Ne) or the input speed of the transmission 11 is synchronized to a synchronous speed after the shifting operation by reducing the torque capacity of the engagement device to be disengaged while increasing the torque capacity of the engagement device to be engaged. In the initial phase of the shifting operation, that is, in a torque phase, the torque is changed but a speed is not changed. Thereafter, the torque capacity of the engagement device to be disengaged decreases and the torque capacity of the engagement device to be engaged increases, and the input speed of the transmission 11 begins to change toward the synchronous speed. A state in which a speed change (i.e., slippage) is caused is called the inertia phase. Accordingly, in the inertia phase, the engine speed is changed toward the synchronous speed, and rotational speeds of the rotary elements MR1 to MR4 of the transmission 11 are also changed to shift the gear stage.

During execution of the shifting operation, a shift shock may be generated when the engine torque and the inertia torque of the engine 12 resulting from a change in the engine speed (Ne) is applied simultaneously to the input shaft 39 of the transmission 11. In order to reduce such shift shock, the torque-down controller 52 is configured to reduce shortens the shifting time by reducing an amount of energy to be absorbed to cause a change in speed during the shifting operation, and to reduce the engine torque in the inertia phase.

To this end, the torque-down controller 52 executes an air intake limiting control to reduce a throttle opening, an ignition retardation control to cause a delay in an ignition timing from an optimal ignition timing (minimum advance for best torque (MBT)) in a current driving state, a fuel cut-off control, and ignition cut-off control.

For example, an ignition timing may be detected on the basis of a detection signal from a knocking sensor attached to the engine 12. Alternatively, an ignition timing may also be detected on the basis of a detection signal from a pressure sensor arranged in the cylinder.

The torque-down controller 52 executes at least one of the air intake limiting control and the ignition retardation control. Given that engine 12 is provided with a supercharger, ignition retardation control may be restricted to prevent an increase in catalyst bed temperature resulting from an increase in exhaust temperature. For this reason, the air intake limiting control may be executed more frequently. Given that engine 12 is provided with a supercharger, the air intake amount control by manipulating a west gate valve and a variable valve may be performed simultaneously with the ignition retardation control. Since the responsiveness of the electronic throttle valve is limited, it may take some time until to start reducing the torque from the commencement of the torque-down, in comparison with the ignition retardation control.

For this reason, at the commencement of torque-down control, the target torque (Td) may be significantly deviated from the actual torque (Tc). The target torque corrector 51 is configured to calculate an integrated value (T(n)) of differences (Δt) between the target torque (Td) and the actual torque (Tc) during a calculation period (T0) from the commencement of the inertia phase to a predetermined point before the termination of the inertia phase, and correct the target torque (Td) in a remaining period (T2) from the predetermined point to the termination of the inertia phase using the integrated value (T(n)) in such a manner that the input speed is adjusted to the synchronous speed. Note that a calculation period (T0) may be set in any period during the inertia phase.

For example, the difference calculator 57 and the integrator 58 are configured to calculate the integrated value (T(n)) of the differences (Δt) between the target torques (Td) and the actual torques (Tc). The distributor 59 allocates, for example, the integrated value (T(n)) to the target torque (Td) in the remaining period (T2). That is, the distributor 59 is configured to: divide the remaining period into predetermined units of time; obtain a correction amount (TQ) for each unit of time by dividing the integrated value (T(n)) by the units of time; and correct the target torque (Td) for each unit of time using the obtained correction amount (TQ). In the following explanation, the target torque (Td) corrected by the correction amount (TQ) will be referred to as a corrected target torque (Td').

The limiter 61 is configured to limit the correction amount (TQ) so as to prevent the corrected output torque (Td') to be reduced lower than a misfire limit torque. The misfire limit torque may be determined with reference to a map or using formula for determining the misfire limit torque based on the seventh parameter such as the actual torque (Tc), a fuel injection timing, the air intake amount (Qa), and the engine speed (Ne).

Figure 5:
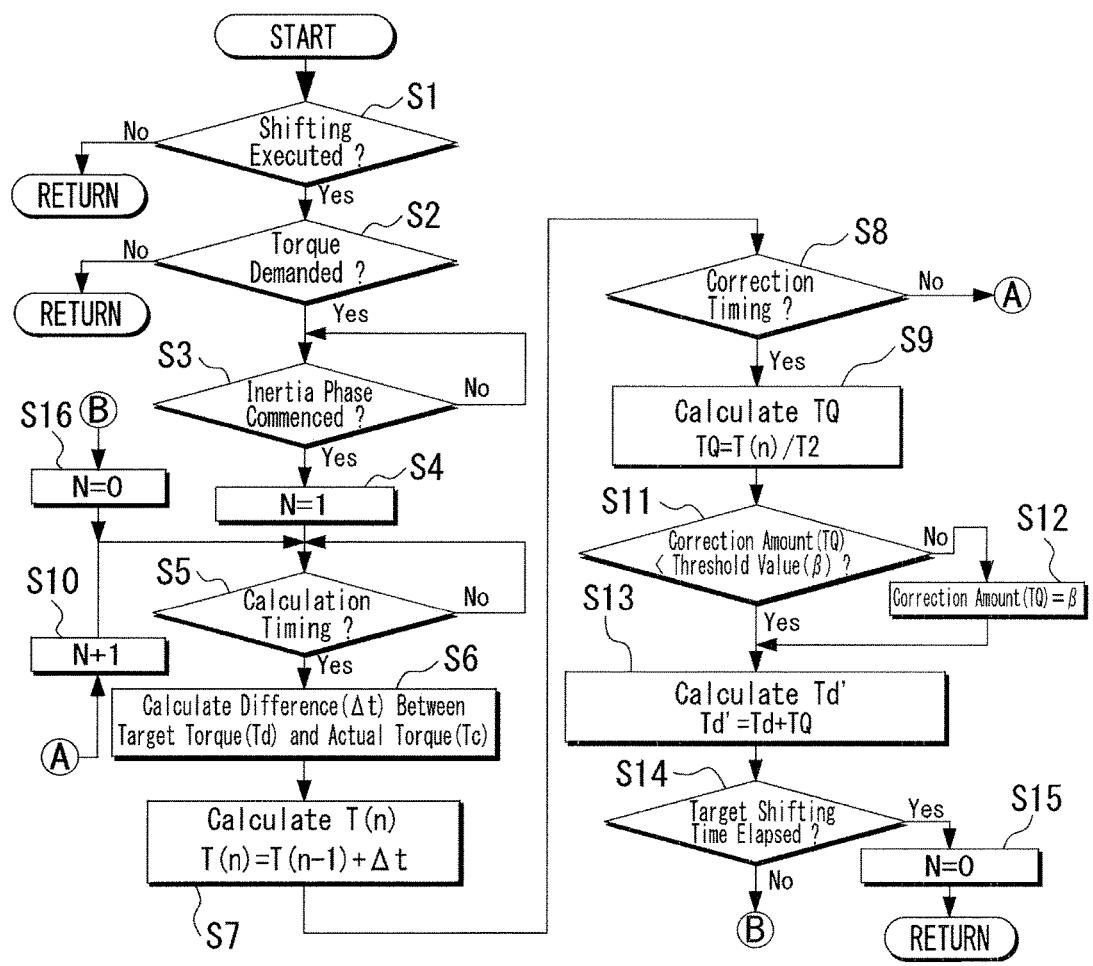
FIG. 5 is a flowchart showing one example of a routine executed by the electronic control unit.

FIG. 5 is a flowchart showing one example of a routine executed by the ECU 20. At step S1, the ECU 20 determines whether or not the shifting operation of the gear stage of the transmission 11 is currently executed. If the ECU 20 determines that the shifting operation is not currently in execution so that the answer of step S1 is NO, the routine returns. By contrast, if the shifting operation is currently in execution so that the answer of step S1 is YES, the routine progresses to step S2 to determine whether or not the accelerator pedal is depressed to increase output torque of the engine 12 (i.e., power-on state). If the accelerator pedal is depressed to increase output torque of the engine 12 so that the answer of step S2 is YES, the routine progresses to step S3. Otherwise, if the accelerator pedal is not depressed so that the answer of step S2 is NO, the process returns.

Specifically, at steps S1 and S2, the ECU 20 determines whether or not an operating point of the engine 12 governed by the vehicle speed (V) and the accelerator pedal depression amount (α) exceeds an upshifting line of a shifting diagram. That is, in the case that the answer of step S2 is YES, this means that conditions for executing a power-on upshifting are satisfied, and the upshifting is commenced at step S3.

At step S3, the ECU 20 determines whether or not the inertia phase has been commenced. For example, commencement of the inertia phase may be detected based on a fact that the input speed of the transmission 11 is changed in a predetermined value from the synchronous speed. Alternatively, commencement of the inertia phase may also be detected on the basis of a speed difference between an input member and an output member of the engagement device to be disengaged. If the inertia phase has commenced so that the answer of step S3 is YES, the routine progresses to step S4. By contrast, if the inertia phase has not yet commenced so that the answer of step S3 is NO, the routine stays at step S3 until the commencement of the inertia phase is detected. In the case that the inertia phase has commenced so that the answer of step S3 is YES, the target torque corrector 51 starts counting time from the commencement of the inertia phase using the counter circuit 63.

At step S4, the target torque corrector 51 sets a number of times (N) of calculation of the difference (Δt) between the target torque (Td) and the actual torque (Tc) to "1", and the routine progresses to step S5.

At step S5, the difference calculator 57 determines whether or not a predetermined calculation period (T0) has elapsed from the commencement of the inertia phase to reach calculation timing (T0), on the basis of the count value counted by the counter circuit 63. If the elapsed time reaches the calculation timing (T0) so that the answer of step S5 is YES, the routine advances to step S6. By contrast, if the elapsed time has not yet reached the calculation timing (T0) so that the answer of step S5 is NO, the routine stays at step S5 until the elapsed time reaches the calculation timing (T0). The calculation period (T0) is the period between the commencement of the inertia phase and the time point at which a predetermined period has elapsed, and corresponds to the timing of calculating the difference (Δt) between the target torque (Td) and the actual torque (Tc). Note that the calculation period (T0) may be a predetermined cycle. In addition, the calculation period (T0) is an example of a predetermined period of time in this embodiment of the present application.

At step S6, the difference calculator 57 calculates the difference (Δt) between the target torque (Td) and the actual torque (Tc). The routine then progresses to step S7.

At step S7, the integrator 58 adds the currently calculated difference (Δt) to the previously calculated integrated value (T(n−1)). As described, the target torque corrector 51 includes the storage 64 (see FIG. 4). The resultant integrated value (T(n)) is temporarily stored in the storage 64. The routine then progresses to step S8.

At step S8, the integrator 58 determines whether or not the elapsed time reaches a predetermined correction timing on the basis of the value counted by the counter circuit 63. If the integrator 58 determines that the elapsed time reaches the predetermined correction timing so that the answer of step S8 is YES, the routine progresses to step S9. By contrast, if the elapsed time has not yet reached the predetermined correction timing so that the answer of step S8 is NO, the routine progresses to step S10. At step S10, the target torque corrector 51 counts up the number of times (N) of calculation of the difference (Δt) between the target torque (Td) and the actual torque (Tc) as indicated as "N+1" in FIG. 5. Then, the routine progresses to step S5 to repeat calculation of the difference (Δt), and the newly calculated difference (Δt) is added to the previously calculated integrated value (T(n−1)). Note that the correction timing is the timing at which a predetermined correction period (T1) has elapsed from the commencement of the inertia phase or the termination of the previous correction period, and corresponds to the timing at which the target torque (Td) is corrected. The correction period (T1) may also be a predetermined cycle but the correction period (T1) should be equal to or longer than the calculation period (T0). Note that the case of correction timing=calculation timing is an example of a predetermined timing in this embodiment.

If the integrator 58 determines that the elapsed time reaches the correction timing so that the answer of at step S8 is YES, the routine progresses to step S9. At step S9, the integrator 58 reads out the integrated value (T(n)) stored in the storage 64, and obtains the correction amount (TQ) for each unit time by dividing the integrated value (T(n)) by the remaining period (T2). Given that the correction timing is the first correction timing, the remaining period (T2) may be calculated by subtracting the correction period (T1) between the commencement of the inertia phase and a predetermined time point at which the first correction timing has been reached from the target gear shifting time (Ttgt). Given that the correction timing is the second and subsequent correction timings, the next correction timing is to be the time point at which a second correction period (T1') has elapsed from the previous correction timing, and a remaining period (T2') is to be a period from the next correction timing to the time point at which the target shifting time (Ttgt) terminates. Note that the first correction period (T1) may be not only equal to but also different from the next correction period (T1'). The remaining periods (T2, T2') are calculated by the remaining period calculator 56. The target shifting time (Ttgt) corresponds to the inertia phase, and is temporarily stored in the storage 64 after determined by the target shifting time determiner 55. After the integrator 58 executes step S9, the routine progresses to step S11.

At step S11, the limiter 61 determines whether or not the correction amount (TQ) is smaller than a threshold (β). The threshold (β) is a value for limiting the correction amount (TQ) so as to inhibit the corrected target torque (Td') from falling below the misfire limit torque. If the correction amount (TQ) is smaller than the threshold (β) so that the answer of step S11 is YES, the routine progresses to step S13. By contrast, if the correction amount (TQ) is not smaller than the threshold (β) so that the answer of step S11 is NO, the routine progresses to step S12. At step S12, the target torque corrector 51 sets the correction amount (TQ) as a target value to the threshold (β), and the routine progresses to step S13. Note that the limiter 61 may determine, whether or not the corrected target torque (Td') is lower than the misfire limit torque, on the basis of the integrated value (T(n)) instead of the correction amount (TQ).

At step S13, the distributor 59 adds the correction amount (TQ) to the target torque (Td) for each unit time. Consequently, an error accompanying a torque-down control response delay or the like is eliminated from the corrected target torque (Td'). Then, the routine progresses to step S14.

At step S14, the target torque corrector 51 determines whether or not the target shifting time (Ttgt) has elapsed, that is, the inertia phase has terminated on the basis of the value counted by the counter circuit 63. If the inertia phase has not yet terminated so that the answer of step S14 is NO, the routine progresses to step S16. At step S16, the number of times (N) of calculation of the difference (Δt) is cleared to "0", and the routine progresses to step S5 to newly start to calculate the integrated value of differences in the respective calculation periods (T0'). The calculation period (T0) executed in the first correction period (T1) may be not only equal to but also different from the calculation period (T0') executed at the next correction timing (T1'). Note, however, the calculation period (T0') should be equal to or shorter than correction period (T1').

If the target torque corrector 51 determines that the inertia phase has terminated so that the answer of step S14 is YES, the routine progresses to step S15. At step S15, the target torque corrector 51 clears the number of times (N) of calculation of the difference (Δt) to "0", and also clears the value of the counter circuit 63 to "0". The routine then returns to step S1. Note that the present disclosure is not limited to the control procedure described with reference to FIG. 5.

Here, at steps S11 and S12 described with reference to FIG. 5, although the target value (threshold α) is set in such a manner as not to falls below the misfire limit, the present disclosure is not limited to this. For example, the target value may also be permitted to falls below the misfire limit. In this case, when the target engine torque (Td') becomes lower than the minimum torque of the engine 12, the fuel cut-off control is executed.

Figure 6:
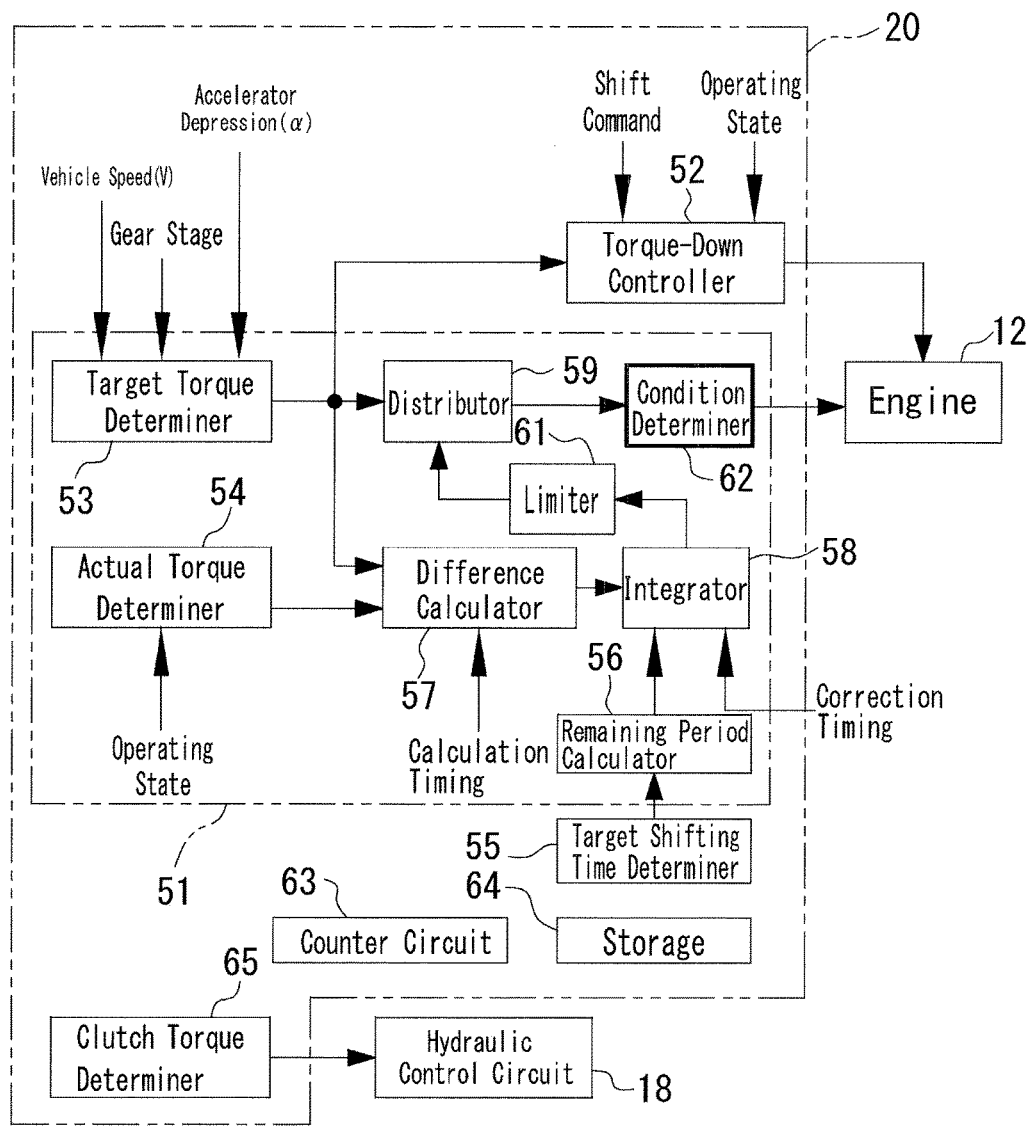
FIG. 6 is a block diagram showing functions of the electronic control unit to execute the fuel cut-off control.

FIG. 6 shows another embodiment to execute the fuel cut-off control. As shown in FIG. 6, the target torque corrector 51 includes a condition determiner 62 indicated between the distributor 59 and the engine 12. The condition determiner 62 is configured to determine satisfaction of a condition for reducing the corrected target torque (Td') to ta predetermined minimum torque. If the condition determiner 62 determines that the condition for reducing the correction target torque (Td') to the minimum torque is satisfied, the ECU 20 executes the fuel cut-off control to stop the fuel supply. The minimum torque means the minimum torque of the engine 12 without taking into consideration the misfire that is expressed by a function of the engine speed (Ne). After execution of the fuel cut-off control, the correction amount (TQ) is obtained, and the target torque (Td) is corrected. The same reference numerals as in FIG. 6 denote the same or similar members in FIG. 4, and a detailed description therefore will be omitted.

Figure 7:
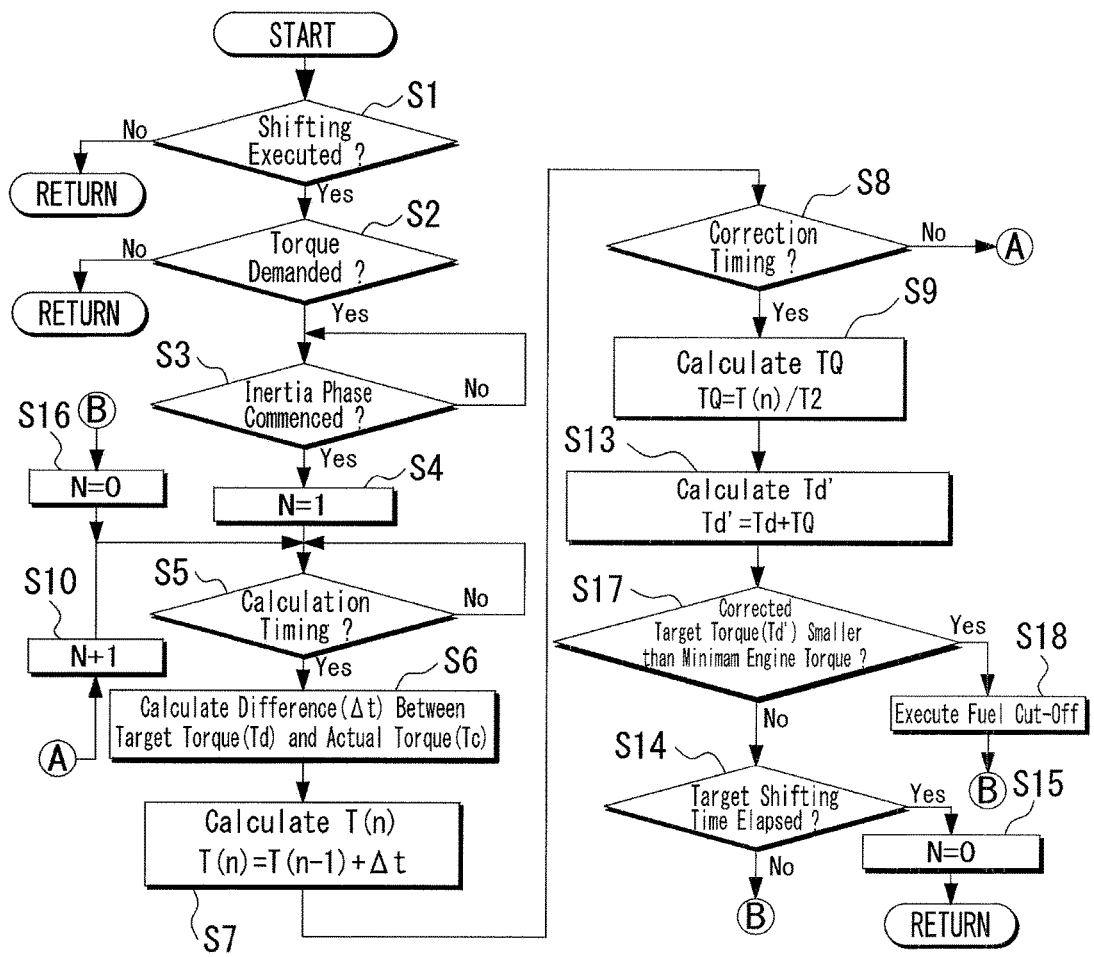
FIG. 7 is a flowchart showing a routine to execute the fuel cut-off control.

FIG. 7 shows an example of a routine executed by the embodiment described with reference to FIG. 6. As shown in FIG. 7, the condition determiner 62 determines at step S17 whether or not the corrected target torque (Td') is a negative torque and smaller than the minimum torque of the engine 12 determined in advance. If the corrected target torque (Td') is smaller than the minimum torque so that the answer of step S17 is YES, the routine progresses to step S18. By contrast, if the corrected target torque (Td') is not smaller than the minimum torque so that the answer of step S17 is NO, the routine progresses to step S14. At step S18, the ECU 20 executes the fuel cut-off control to stop the fuel supply to the engine 12. Consequently, the actual torque (Tc) may decrease to widen the difference between the target torque (Td) and the actual torque (Tc). For this reason, after the target torque corrector 51 executes the fuel cut-off control, the routine returns to the procedure for correcting such difference. That is, the routine progresses to step S16 to clear the number of times (N) of calculation of the difference (Δt) to "0", and then progresses to step S5 to start a new calculation. The same reference numerals as in FIG. 7 denote the same or similar processing units in FIG. 5, and a detailed description of them will be omitted.

Figure 8:
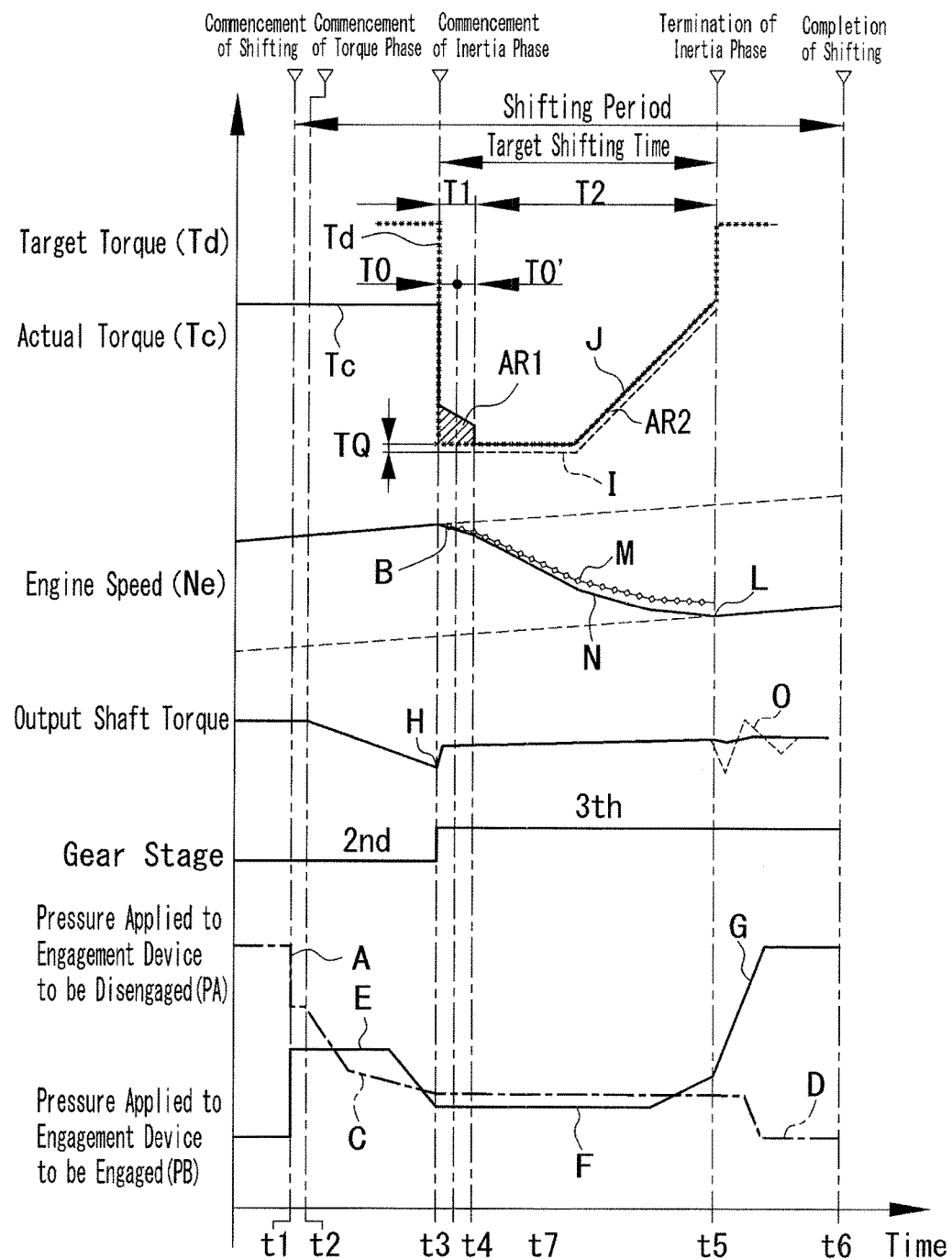
FIG. 8 is a time chart during execution of the routine shown in FIG. 5.

FIG. 8 is a time chart showing temporal changes in each parameter during execution of the shifting operation in a case that the driver depresses the accelerator pedal with a constant load to cause a shifting from the second stage to the third stage. Specifically, FIG. 8 shows temporal changes in the target torque (Td), the actual torque (Tc), the engine speed (Ne), the output shaft torque of the transmission 11, the gear stage, the hydraulic pressure (PA) applied to the engagement device to be disengaged, and the hydraulic pressure (PB) applied to the engagement device to be disengaged. Note that the lockup clutch 45 is in complete engagement during the shifting operation shown in FIG. 8.

As described with reference to FIGS. 2 and 3, the second stage is established by engaging the first clutch C1 and the first brake B1. The third stage is established by disengaging the first brake B1 and engaging the second clutch C2 while keeping the first clutch C1 in engagement.

In FIG. 8, the hydraulic pressure (PA) applied to the first brake B1 to be disengaged is indicated by the dashed line. The hydraulic pressure (PA) is reduced stepwise to a predetermined level at point t1 at which the upshifting is commenced as indicated by "A", on the basis of the actual torque (Tc) and the vehicle speed (V). At point t3, the first brake B1 starts slipping, and the engine speed (Ne) starts decreasing toward the synchronous speed as indicated by "B". From point t3, the ECU 20 executes the feedback control of the hydraulic pressure (PA) applied to the first brake B1 so as to reduce the engine speed (Ne) at a predetermined rate as indicated by "C". After point t5, the ECU 20 further reduces the hydraulic pressure (PA) applied to the first brake B1 thereby reducing the torque capacity of the first brake B1 to 0 as indicated by "D", and then the shifting operation is completed at point t6.

The hydraulic pressure (PB) applied to the second clutch C2 is indicated by the solid line. At point t1, in order to promptly raise the actual hydraulic pressure of the second clutch C2, the fast-fill control is executed to raise the hydraulic pressure (PB) to a predetermined level as indicated by "E". Then, during the inertia phase from point t3 to point t5, the hydraulic pressure (PB) is kept to a level as indicated by "F" at which the torque capacity of the second clutch C2 is maintained to the minimum capacity. At point t5 as a termination of the inertia phase, synchronization of the engine speed (Ne) with the target speed to be achieved after the shifting operation is determined, and the hydraulic pressure (PB) applied to the second clutch C2 is increased to prevent abrupt rise in the engine speed (Ne) as indicated by "G". In FIG. 8, the period from point t2 to point t3 corresponds to the torque phase, and the period from point t3 to point t5 corresponds to the inertia phase.

Thus, in the inertia phase of the power-on upshifting, the engine speed (Ne) is reduced by changing the torque capacities of the engagement devices to be disengaged and to be engaged thereby causing a slip in each of the engagement devices. Here, the engine speed (Ne) corresponds to the input shaft speed of the transmission 11.

When the input shaft speed of the transmission 11 is rapidly reduced as indicated by "B", an inertia force or an inertia torque is generated on the output shaft of the transmission 11 with the change in the speed. Such inertia torque temporarily increases the output shaft torque of the transmission 11 to cause torque fluctuations, and this may cause a shift shock as indicated by "H". For this reason, the torque-down control of the engine 12 is performed in cooperation with the above control to absorb the inertia torque.

Specifically, torque-down control is executed at point t3 as the starting point of the inertia phase. Point t4 is the point at which the correction period (T1) has elapsed from the starting point of the inertia phase. In FIG. 8, the hatched area AR1 represents the integrated value of the difference between the actual torque (Tc) and the target torque (Td) until the end of the correction period (T1) from point t3 to point t4. That is, the area AR1 represents the total increase of the actual torque (Tc) with respect to the target torque (Td).

Figure 9:
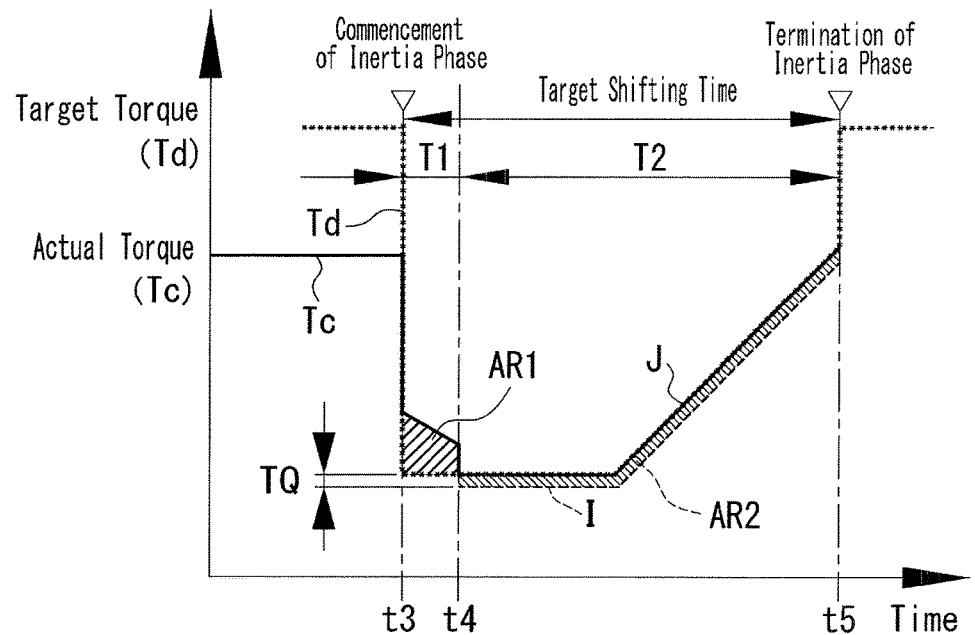
FIG. 9 is a partial time chart showing an area AR1 shown in FIG. 8 in more detail.

FIG. 9 shows the area AR1 in more detail. As shown in FIG. 9, the integrated value (T(n)) corresponding to the area AR1 is evenly allocated within a hatched area AR2 in the remaining period (T2) from point t4 to point t5, between a line I representing the corrected target torque (Td') and a line J representing the target torque (Td). Accordingly, the area AR2 corresponds to the total correction amount of the target torque. In this embodiment, the integrated value (T(n)) is averaged within the remaining period (T2) to obtain the correction amount (TQ) for each unit of time.

Figure 10:
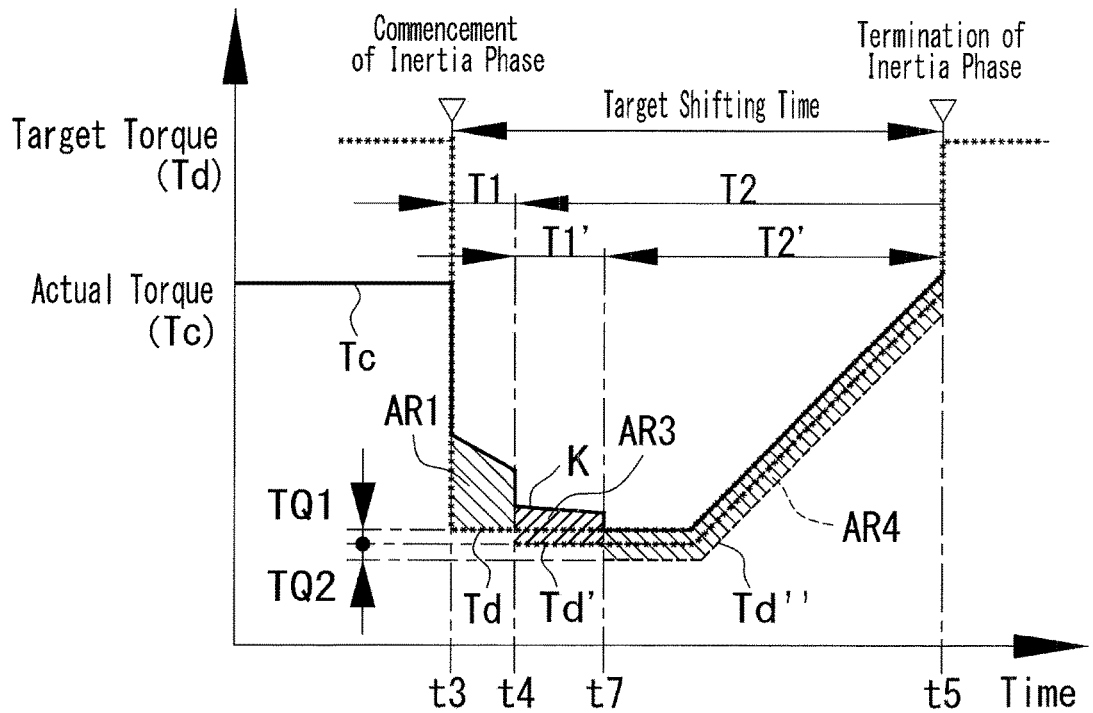
FIG. 10 is a time chart showing a situation during a subsequent correction.

FIG. 10 shows a situation during the subsequent correction. For example, the second correction is executed at point t7 at which the second correction period (T1') has elapsed since the elapse of the first correction period (T1). In FIG. 10, an area AR3 (excluding the area AR1) between the line representing the correction target torque (Td') and a line K representing the actual torque (Tc) in the correction period (T1') corresponds to the second integrated value (T(n)). The target torque (Td') is the value obtained by adding the correction amount (TQ1) to the target torque (Td) set at the starting time point of the inertia phase. The target torque corrector 51 obtains a correction amount (TQ2) for each unit time by dividing the second integrated value (T(n)) for each unit of time in the remaining period (T2') from point t7 to point t5 at the end of the inertia phase. In this case, a target torque (Td") is obtained by adding the current correction amount (TQ2) to the target torque (Td'). An area AR4 represents the total correction amount of the target torque (Td") in the remaining period (T2'). Note that when the second correction is to be executed, the correction amount (TQ2) may be obtained for each unit of time by dividing the sum of the total amount (area AR1) of the previous integrated value and the total amount (area AR3) of the current integrated value for each unit time of the remaining period (T2'). Note that correction may be performed three or more times within a target gear shift time.

According to the foregoing controls, the engine 12 is controlled to generate the corrected output torque (Td') calculated by adding the correction amount (TQ) for each unit of time to the target torque (Td) for each unit of time. As described with reference to FIG. 5, the target torque (Td) is corrected in such a manner that the area AR1 corresponding to the integrated value (T(n)) of the differences between the actual torque (Tc) and the target torque (Td) in the correction period (T1) is corrected into the area AR2 corresponding to the total correction amount of the target torque (Td) in the remaining period (T2). According to the embodiment, therefore, it is possible to synchronize the engine speed (Ne) with the target speed after the elapse of the target shifting time (Ttgt) as indicated by "L". Note that the line indicated by "M" represents the engine speed (Ne) of a case in which the target torque (Td) is not corrected, that is higher than the engine speed (Ne) of the case in which the target torque (Td) is corrected.

Thus, according to the embodiment explained with reference to FIG. 8, the engine speed (Ne) is controlled along the solid line indicated by symbol "N" which represents the engine speed (Ne). For this reason, a shift shock represented by a dotted line "O" generated on the output shaft may be reduced. In addition, since the target torque (Td) is corrected in the inertia phase, variations in an actual shifting time, that is, variations in the inertia phase may be reduced. Further, given that the target torque (Td) is changed during the inertia phase, an actuator for the throttle valve is actuated to achieve the changed target torque (Td). In this situation, the actual torque may be deviated from the changed target torque by the actuation of the actuator. According to the embodiment, however, the correction of the target torque (Td) is repeated in the inertia phase so that such deviation of the torque may be reduced.

In each embodiment described with reference to FIGS. 5 to 10, although the target torque (Td) is corrected a plurality of times in the inertia phase, the correction of the target torque (Td) may be executed only once in an initial phase of the inertia phase. The deviation of the actual torque (Tc) from the target torque (Td) may be caused by a response delay resulting from a reduction in the air intake amount (Qa) executed in an initial phase of the torque-down control. For this reason, by thus executing the correction of the target torque (Td) only once in the initial phase of the inertia phase, the actual torque (Tc) may be adjusted continuously to the target torque (Td) even after the correction. If the correction is executed in an intermediate phase or later in the inertia phase, the difference between the actual torque (Tc) and the target torque (Td) may increase. In this situation, if the target torque (Td) is corrected at once based on the correction amount (TQ) corresponding to the large difference, the difference between the actual torque (Tc) and the target torque (Td) may be increased again. For this reason, it is preferable to execute the correction in the initial phase of the inertia phase.

Figure 11:
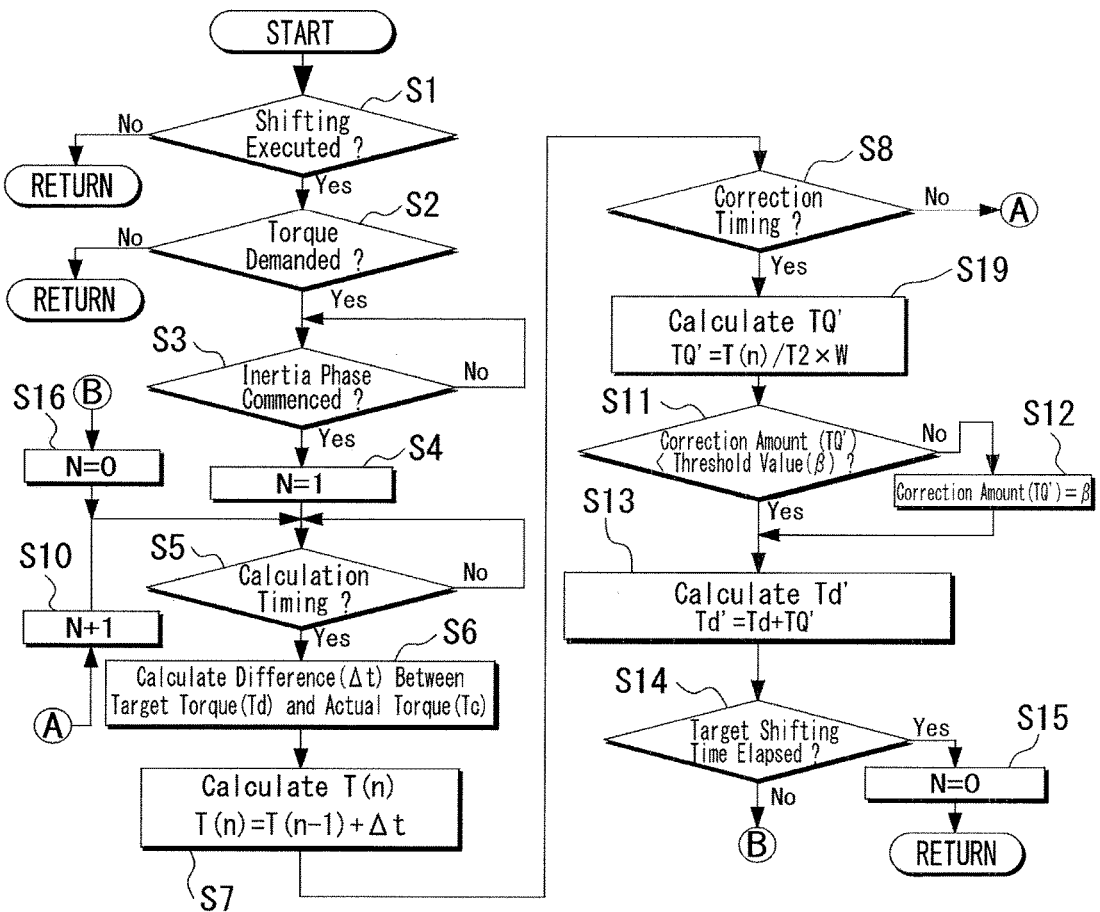
FIG. 11 is a flowchart showing a routine for weighting a correction value.

FIG. 11 shows another embodiment for weighting a correction value. In the routine shown in FIG. 11, at step S19, the integrator 58 calculates a correction amount (TQ') by multiplying the correction amount (TQ) obtained for each unit of time in the remaining period (T2) by a weighting coefficient (W) determined in advance taking into account the degree of progress of the shifting operation. At step S19, specifically, the integrator 58 calculates the correction amount (TQ') in such a manner that the correction amount (TQ') is kept to be equal to or smaller than the integrated value (T(n)). In the routine shown in FIG. 11, the correction amount (TQ') is calculated by dividing the integrated value (T(n)) by a remaining number of times (N) of the correction. The remaining count (N) is calculated by dividing the remaining period (T2) by the correction period. The correction amount (TQ') corresponds to a value for each predetermined unit of time obtained by dividing the remaining period (T2) by the correction period (T1).

Figure 12:
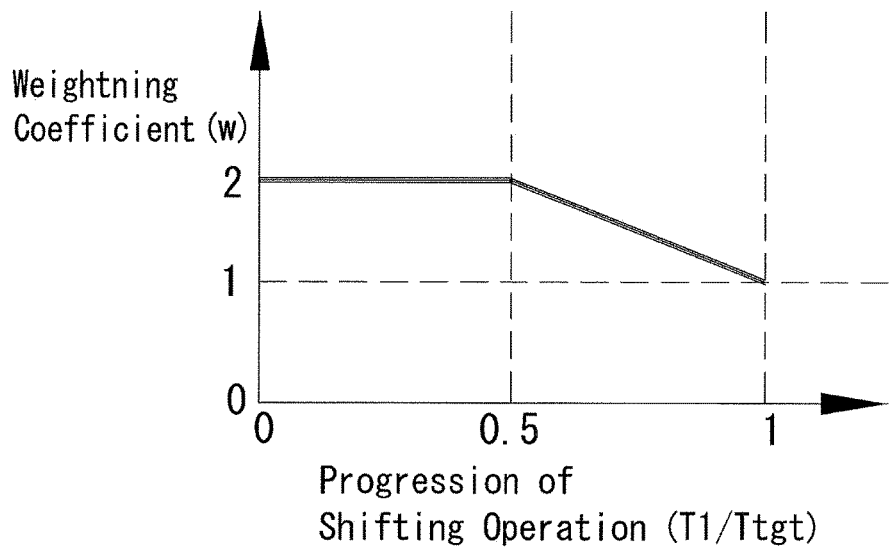
FIG. 12 is a graph indicating a relationship between a weighting coefficient and a progression of a shifting operation.

FIG. 12 shows an example of a relation between the weighting coefficient (W) and the degree of progress of the shifting operation. In FIG. 12, the vertical axis represents the weighting coefficient (W) and the horizontal axis represents the degree of progress of the shifting operation in the inertia phase. The degree of progress of the shifting operation may be calculated by dividing the correction period (T1) by the target shifting time (Ttgt). According to the example shown in FIG. 12, in a period in which the degree of progress of the shifting operation is "0" to "0.5", the correction amount (TQ') is weighted by the relatively greater weighting coefficient (w) such as "2". Then, in a period in which the degree of progress of the shifting operation is "0.5" to "1", the weighting coefficient (w) is gradually reduced to "1". Since the correction amount (TQ') is weighted by the relatively greater weighting coefficient (w) in the initial phase of the inertia phase, the correction amount (TQ') will not be changed significantly in the later phase of the inertia phase.

The correction amount (TQ') is calculated using the weighting coefficient (W) shown in FIG. 12 by the following procedures. For example, given that the integrated value (T(n)) is set to "10" and the number of times (n) of the correction is set to "10", the first correction amount (TQ') is calculated by multiplying the value obtained by dividing the integrated value "10" by the remaining times of the correction "10", by the weighting coefficient (W) "2", as expressed as "10/10×2=2". Then, the second correction amount (TQ') is calculated by multiplying the value obtained by dividing the integrated value (T(n)) expressed as "10−2=8" by the remaining times of the correction "10−1=9", by the weighting coefficient (W) "2". Accordingly, the second correction amount (TQ') may be expressed as "8/9×2=approx. 1.8". Then, the third correction amount (TQ') is calculated by multiplying the value obtained by dividing the integrated value (T(n)) "8−1.8 approx. 6.2" by the remaining times of the correction "10−2=8", by the weighting coefficient (W) "2". Accordingly, the fourth correction amount (TQ') may be expressed as "6.2/8×2=approx. 1.55". Thus, according to the example shown in FIG. 12, the first to fifth corrections are executed in the initial phase of the inertia phase while setting the weighting coefficient (W) to "2". In the later phase of the inertia phase, the sixth to 10th correction amounts (TQ') are calculated while gradually reducing the weighting coefficients (W) to "1".

Figure 13:
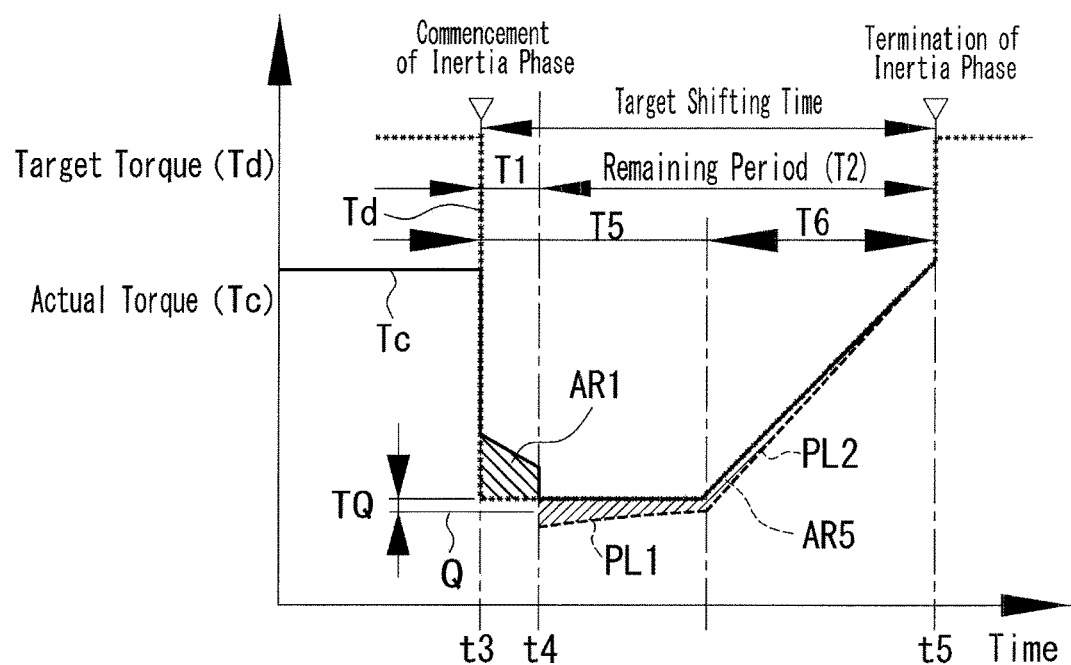
FIG. 13 is a time chart showing a situation during execution of the routine shown in FIG. 11.

FIG. 13 shows a situation during the corrections while reducing the weighting coefficients (W) as shown in FIG. 12. In FIG. 13, the vertical axis represents the target torque (Td) and the actual torque (Tc) shown in the timing chart of FIG. 8, and other parameters are omitted. In FIG. 13, the corrected target torques (Td') calculated using the weighting coefficient (W) are indicated by lines PL1 and PL2. In the initial phase T5 of the inertia phase, the correction amounts (TQ') are calculated using the relatively large weighting coefficient (W), the line PL1 falls below a line Q representing the corrected target torque (Td') shown in FIG. 8 calculated without using the weighting coefficient (W), while gradually approaching toward the line Q with the degree of progress of the shifting operation. As indicated by the line PL2, the actual torque (Tc) reaches the target torque (Td) at time t5 as the termination of the inertia phase.

In the example shown in FIG. 13, the target torque (Td') is corrected by the weighting coefficient (W) in such a manner that the area AR1 corresponding to the integrated value (T(n)) of the differences between the actual torque (Tc) and the target torque (Td) in the correction period (T1) is corrected into the area AR5 corresponding to the total correction amount of the target torque (Td) in the remaining period (T2).

Although the above exemplary embodiment of the present application have been described, it will be understood by those skilled in the art that the present application should not be limited to the described exemplary embodiment, and various changes and modifications can be made within the spirit and scope of the present application. For example, in the above embodiments, the correction amount (TQ) is calculated for each predetermined correction period (T1, T1'). However, a limit for limiting the upper limit value of the integrated value (T(n)) may be provided for the integrator 58 in advance, and the integrated value (T(n)) may be allocated to a remaining period every time the integrated value (T(n)) reaches the upper limit value.

In addition, the above embodiments are applied to the case in which power-on upshifting is performed. However, the present disclosure is not limited to this, and may also be applied to power-off upshifting to be executed when traveling down a downward slope.

What is claimed is:

1. A shift control system that is applied to a vehicle including a geared automatic transmission connected to an output side of an engine in which a gear stage is shifted among a plurality of stages by manipulating a plurality of engagement devices, comprising:

a controller that controls an output torque of the engine during shifting operation of the gear stage of the transmission, wherein the controller is configured to set a target torque of an output torque of the engine in an inertia phase in which an input speed of the transmission is changed by a shifting operation of the gear stage toward a synchronous speed to be achieved in the gear stage to be established after the shifting operation, calculate an actual torque of the engine in the inertia phase, perform a feedback control of the actual torque based on a difference between the target torque and the actual torque, calculate an integrated value of the difference between the target torque and the actual torque from a commencement of the inertia phase to a predetermined time point before a termination of the inertia phase, and correct the target torque in a remaining period between the predetermined time point and the termination of the inertia phase based on the integrated value in such a manner that the input speed is changed toward the synchronous speed.

2. The shift control system according to claim 1, wherein the controller is further configured to:
divide the remaining period into predetermined units of time; and
calculate a correction amount for correcting the target torque for each unit of time by dividing the integrated value by the units of time.

3. The shift control system according to claim 2, wherein the controller is further configured to correct the correction amount using a weighting coefficient determined in accordance with a degree of progress of the shifting operation.

4. The shift control system according to claim 3, wherein the controller is further configured to correct the correction amount in an initial phase of the inertia phase using the weighting coefficient that is larger than the weighting coefficient used in the later phase of the inertia phase.

5. The shift control system according to claim 2, wherein the controller is further configured to calculate the correction amount for each correction period in the inertia phase.

6. The shift control system according to claim 1, wherein the controller is further configured to limit the integrated value so as to inhibit the corrected target torque to be reduced lower than a misfire limit torque obtained based on an operating state of the engine.

7. The shift control system according to claim 1, wherein the controller is further configured to stop fuel supply to the engine when the target torque corrected by the integrated value falls below a minimum torque of the engine.

* * * * *